United States Patent
Burch et al.

(10) Patent No.: US 7,515,591 B1
(45) Date of Patent: Apr. 7, 2009

(54) PRIMARY CHANNEL BANK-RESIDENT MECHANISM FOR SCHEDULING DOWNSTREAM DATA TRANSMISSIONS TO PORTS OF MULTIPLE CHANNEL BANKS

(75) Inventors: Richard A. Burch, Madison, AL (US); Neil M. Jensen, Madison, AL (US); Dennis B. McMahan, Huntsville, AL (US); Timothy David Rochell, Elkmont, AL (US)

(73) Assignee: Adtran, Inc., Huntsville, AL (US)

( * ) Notice: Subject to any disclaimer, the term of this patent is extended or adjusted under 35 U.S.C. 154(b) by 873 days.

(21) Appl. No.: 10/930,095

(22) Filed: Aug. 31, 2004

(51) Int. Cl.
*H04L 12/28* (2006.01)
(52) U.S. Cl. .................................. 370/395.1
(58) Field of Classification Search ............. 370/395.1, 370/395.7, 369, 396, 232, 235, 399, 400, 370/416; 709/234
See application file for complete search history.

(56) References Cited

U.S. PATENT DOCUMENTS 6,754,206 B1 * 6/2004 Nattkemper et al. ........ 370/369

* cited by examiner

*Primary Examiner*—Chi H Pham
*Assistant Examiner*—Alexander Boayke
(74) *Attorney, Agent, or Firm*—Allen, Dyer, Doppelt, Milbrath & Gilchrist, P.A.

(57) ABSTRACT

A data transmission scheduler subsystem for a multi-channel bank communication system architecture contains a plurality of 'per port' schedulers. Each per port scheduler is resident in the system's primary channel bank, and is operative to controllably cause customer-destined data, that has been buffered from a communication network into switch fabric storage circuitry of the primary channel bank, to be controllably read out for downlink transmission to associated destination data ports of the channel banks at the destination data ports' data rates.

24 Claims, 3 Drawing Sheets

PRIMARY CHANNEL BANK-RESIDENT MECHANISM FOR SCHEDULING DOWNSTREAM DATA TRANSMISSIONS TO PORTS OF MULTIPLE CHANNEL BANKS

CROSS-REFERENCE TO RELATED APPLICATION

The present application relates to subject matter disclosed in co-pending U.S. patent application Ser. No. 10/930,101 (hereafter referred to as the '101 application), filed on Aug. 31, 2004, entitled: "System Architecture for Linking Channel Banks of a Data Communication System," by R. Burch et al, assigned to the assignee of the present application, and the disclosure of which is incorporated herein.

The present invention relates in general to telecommunication systems and subsystems thereof, and is particularly directed to a data transmission scheduler subsystem that is adapted for use in a multi-channel bank communication system architecture of the type described in the '101 application. This data transmission scheduler subsystem is formed of a plurality of 'per port' schedulers, each of which is resident in the system's primary channel bank, and is operative to controllably cause customer-destined data, that has been buffered from the network into the switch fabric storage circuitry of the primary channel bank, to be controllably read out for downlink transmission to an associated destination data port at that port's data rate.

BACKGROUND OF THE INVENTION

As described in the '101 application, an on-going objective of the telecommunications industry is to increase the number of customers that may be serviced by a single channel bank/equipment shelf connection with a network, such as but not limited to a DS3 or OC3 network connection. In the past, this objective has been addressed primarily by using either bus extension or channel bank subtending. Pursuant to the bus extension approach, the physical length of the backplane bus of a master channel bank is increased by means of a bus extension (e.g., ribbon) cable, in order to allow more line cards to be daisy chain-connected to the bus. In this type of architecture, upstream directed data (from the customer to the network) passes from a customer interface with a line card onto the bus extension, and then into the switching fabric through which a connection with the network is afforded, using a policing engine (a flow control mechanism) resident within the switching fabric of the master channel bank. Downstream directed data (from the network to a customer) enters the switch fabric where it is scheduled for downstream routing, and then transported across the bus extension into a line card and passed on to the customer. Information concerning policing, scheduling and queuing engines is contained in ITU-T Recommendation I-371 Traffic Control and Congestion Control for B-ISDN.

In the second approach, multiple line card slots of the master channel bank are usurped by channel bank expansion cards, which are respectively linked to associated subtended channel banks. In such an architecture, upstream-directed data passes from the customer interface into a line card of one of the subtended channel banks. From the line card, the data passes into the subtended channel bank's switch fabric, where the data is policed and scheduled for delivery to the network, via the master channel bank's network connection. However, before it is delivered to the network, the data is passed over the primary channel bank's bus into another switch fabric, where is again policed and scheduled. It is then passed onto the network connection for delivery to the network. Downstream-directed data enters the switch fabric of the master channel bank from the network connection, and is transferred therefrom down to a network card (which typically occupies two line card slots of the master channel bank), which passes the data on to the switch fabric of a subtended channel bank, for delivery to a line card of that channel bank. Every time data enters a subtended bank's switching fabric it is policed and scheduled.

The bus extension approach has a number of limitations. For example, given the fact that the extension bus is shared among the master channel bank and one or more expansion channel banks, a problem may arise if one of the channel bank cards malfunctions and seizes control of the extension bus. This could terminate or prevent data transfers on the shared bus. Moreover, since the channel banks are connected by way of a bus extension cable, there is a practical, noise-coupling limitation as to the number of channel banks that can be daisy chained together. In addition, the bus extension cable is usually bulky and expensive.

The network card extension approach is also limited by a number of factors. One is the fact that since the channel banks are interlinked by using network connections that usurp multiple line card slots, the primary bank loses the availability of line cards that would otherwise be used to provide service to customers. Also, the use of network cards adds a greater expense for data expansion, and limits the number of customers that can be serviced by the host channel bank. In addition, as each of the subtended channel banks requires a network connection, the switch fabric must be replicated on each subtended channel bank, which implies the need to replicate policing and scheduling mechanisms, and adds to the expense.

In accordance with the invention disclosed in the '101 application, such drawbacks of conventional channel bank expansion architectures are effectively obviated by a single switch fabric-based, multi-channel bank architecture, containing a primary switch module in which the switch fabric and a downstream-directed traffic scheduler reside, and one or more expansion channel banks that are linked with the primary channel bank by way of upstream and downstream communication links, and distributed within which are policing mechanisms and dynamic cell rate control mechanisms for controlling upstream-directed data from customers to the network.

SUMMARY OF THE INVENTION

The present invention is particularly directed to the configuration of a centralized, multi-port downstream data transport scheduler subsystem and its incorporation into the primary equipment shelf or channel bank of the data communication system architecture of the '101 application. As pointed out briefly above, the centralized data transmission scheduler subsystem contains a plurality of 'per port' schedulers, which are operative to controllably cause customer-destined data cells, that have been buffered from the network into switch fabric storage circuitry of the primary channel bank, to be read out for downlink transmission to associated destination data ports at those ports' data rates.

To this end, the downstream data transport scheduler subsystem comprises a set of N data transport schedulers, where N is the number of data ports served by the multiple channel banks, so that each downstream scheduler is effectively a 'per port' scheduler. As such, each scheduler is associated with a respective one of a plurality of asynchronous transfer mode (ATM) cell buffers of the switch fabric, the cell buffers, in turn, being associated with the ports of the line cards of the primary and secondary channel banks.

A respective per port scheduler contains an accumulator, the contents of which are sequentially incremented by a scheduler clock, and monitored by an associated set of scheduler control logic or scheduler controller, in order to specify the time at which an ATM cell is read out from its switch fabric buffer for transmission to its associated destination port. For this purpose, each scheduler has an input port to which a quantity M is supplied. The value of M is defined by a prescribed relationship between the size of an ATM cell, the data rate of the port with which the scheduler is associated, and a scheduler clock that is used to update the contents of the accumulator and to control the operation of the scheduler's control logic.

The quantity M corresponds to that fraction of an ATM cell, by which the contents of the accumulator must be incremented at each scheduler clock signal (i.e. once per scheduler clock period), in order for the scheduler to properly read out the contents of the ATM cell buffer at the intended data rate of the destination port. For this purpose, the quantity M is coupled to an adder, the output of which is supplied to a substraction unit, whose output is coupled to an upper limit comparator. The output of the upper limit comparator is coupled to the scheduler controller and to an accumulator register, the contents of which are monitored by a scheduler controller.

The subtraction unit is coupled to selectively receive from the scheduler controller a prescribed value C corresponding to that count value of the register that equates exactly to one cell. The scheduler controller monitors the contents of its associated cell buffer within the switch fabric, as well as the contents of the register, and generates a 'transfer cell' output, in response to the cell buffer containing a complete ATM cell, and in response to the contents of the accumulator register being greater than the summation of successive ones of the value M that corresponds to a complete ATM cell. When generating this transfer cell output, the scheduler controller causes the subtraction unit to subtract the value C from the summation output produced by the adder, thereby reducing the contents of the accumulator register by a count value that corresponds to one complete ATM cell.

The upper limit comparator compares the output of the subtraction unit with the highest count value that can be clocked into the accumulator register without causing the register to overflow. As long it is less than this upper limit value, the output of the subtraction unit is coupled by the limit comparator to the accumulator register, so that the output of the subtraction unit may be clocked into the accumulator register by an update clock. However, if the output of the subtraction unit reaches the upper limit value, the upper limit comparator disables further incrementing of the accumulator register, until the output of the subtraction unit falls below the upper limit value.

In operation, as the accumulator register is sequentially incremented by the quantity M at the clock rate of the scheduler clock, the scheduler controller will continuously check the state of its associated cell buffer to determine whether or not a complete cell has been loaded into the associated per port buffer within the switch fabric. In addition, the controller monitors the output of the upper limit comparator and the contents of the accumulator register to determine whether the upper limit comparator indicates that the accumulator register has reached its maximum count value, or whether the contents of the accumulator register has accumulated to a value greater than that corresponding to one complete cell.

In response to the per port cell buffer containing a complete cell, and in response to either of the upper limit comparator indicating that the accumulator register has reached its maximum count value, or the contents of the accumulator register, having accumulated to a value greater than that corresponding to one complete cell, the controller issues a 'transfer cell' command. This command causes the data cell to be read out of its per port buffer and transmitted downlink to its associated port. In addition, upon issuing a transfer cell command, the controller supplies the cell equivalent value C to the subtraction unit, causing the contents of the accumulator register to be reduced by the value C, at the next scheduler update clock signal.

DETAILED DESCRIPTION

Figure 1:
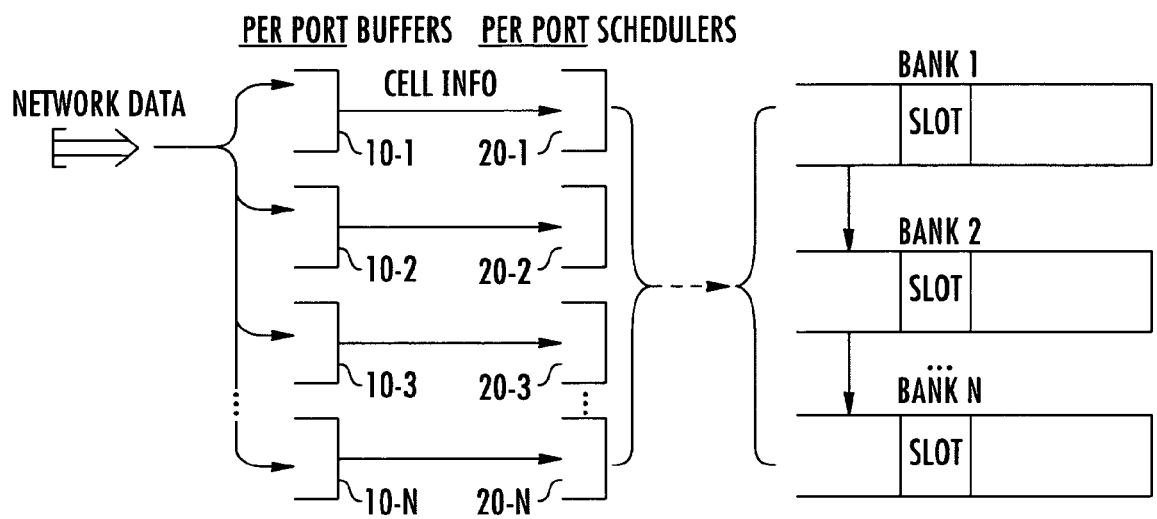
FIG. 1 is a reduced complexity illustration of a plurality of switch fabric cell buffers and associated 'per port' data transmission schedulers of a downstream data transmission scheduler subsystem in accordance with the invention, that is adapted to be incorporated into a multi-channel bank communication system architecture of the type described in the '101 application.

Before detailing the downstream data transport scheduler in accordance with the present invention, it should be observed that the invention resides primarily in a prescribed arrangement of conventional digital communication circuits and components and attendant supervisory communications microprocessor circuitry, as well as application software therefor, that controls the operations of such circuits and components. In a practical implementation that facilitates its incorporation into commercially available digital telecommunication transceiver equipment, the inventive arrangement is preferably configured using field programmable gate array (FPGA)-configured, application specific integrated circuit (ASIC) chip sets. In a practice, digital ASICs are preferred.

Consequently, the configuration of such circuits and components and the manner in which they may be interfaced with telecommunication channels have, for the most part, been shown in the drawings by a readily understandable block diagram, and an associated flow chart, which show only those specific details that are pertinent to the present invention, so as not to obscure the disclosure with details which will be readily apparent to those skilled in the art having the benefit of the description herein. Thus, the block diagram and associated flow chart are primarily intended to show the major components of the invention in convenient functional groupings, whereby the present invention may be more readily understood.

Attention is initially directed to FIG. 1, which is a reduced complexity illustration of a plurality of switch fabric cell buffers and associated 'per port' data transmission schedulers of a downstream data transmission scheduler subsystem in accordance with the invention, and which are adapted to be incorporated into a multi-channel bank communication system architecture of the type described in the '101 application. As noted previously, and as diagrammatically shown in FIG.

1, the switch fabric contains a plurality of ATM cell buffers 10-1, 10-2, 10-3, . . . , 10-N, respective ones of which are associated with respective ports of the line cards of channel banks 12. As a non-limiting example, a respective channel bank may have 28 line card slots and 8 ports per line card. This translates into 224 ports per channel bank that are serviced by the scheduler. In a system having a primary channel bank and three expansion channel banks (for a total of four channel banks), for example, the scheduler is operative to manage downstream ATM cell transmissions to a total of 896 ports.

As shown in FIG. 1 and as described in the '101 application, respectively associated with the N 'per port' ATM cell buffers 10-1, 10-2, 10-3, . . . , 10-N are N 'per port' schedulers 20-1, 20-2, 20-3, . . . , 20-N. These schedulers have the task of reading out ATM cells stored in the switch fabric buffers for delivery to the respective destination ports of the line cards of the various channel banks of the system. As will be described, a principal component of a respective 'per port' scheduler is an accumulator register, the contents of which are successively incremented by a scheduler clock and are monitored by associated scheduler control circuitry, in order to specify the time at which a buffered ATM cell is read out for transmission to its destination port.

Figure 2:
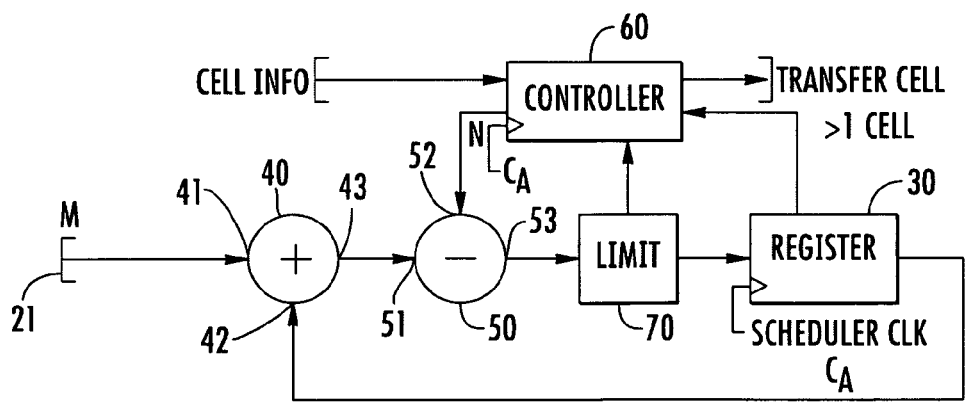
FIG. 2 is a functional block diagram of a respective per port data transmission scheduler.

For this purpose, each 'per port' scheduler is configured in the manner shown in FIG. 2 as having an input port 21, to which a prescribed quantity M is supplied. The value of M is defined in accordance with a predefined relationship between the size of an ATM cell (53 bytes or 424 bits), the data rate of the port with which the respective 'per port' scheduler is associated, and the scheduler update clock $C_A$ that is used to update the contents of an accumulator register 30 within the scheduler. In particular, the value of the quantity M corresponds to that fraction of an ATM cell by which the contents of the scheduler accumulator must be incremented at each scheduler clock signal $C_A$ (i.e. once per scheduler clock period), in order for a respective scheduler to read out the contents of its associated cell buffer at the intended data rate of the output port of interest. This will be readily understood from the example described below.

The quantity M applied to the scheduler's input port 21 is supplied to a first input 41 of an adder 40, which has a second input 42 coupled to receive the contents of register 30. Adder 40 has its output 43 coupled to a first (+) input 51 of a subtraction unit 50, a second (−) input 52 of which is coupled to receive a prescribed value C from a set of control logic or controller 60. The value C corresponds to that count value of the accumulator register 30 that equates to exactly one ATM cell. Controller 60 monitors a 'cell info' input from an associated 'per port' cell buffer 10 within the switch fabric, as well as the contents of the accumulator register 30.

As long as the contents of the cell buffer are less than one complete ATM cell, the 'cell info' input to the controller is at a first logic state (e.g., '0'). Upon the cell buffer containing a complete ATM cell, the 'cell info' input to the controller is at a second logic state (e.g., '1'). Controller 60 generates a 'transfer cell' output, in response to the cell buffer containing a complete ATM cell, and in response to the contents of accumulator register 30 being greater than the summation of successive ones of the value M that corresponds to a complete ATM cell.

In the course of generating a 'transfer cell' output, controller 60 supplies the prescribed value C to the (−) input 52 of subtraction unit 50. This operation has the effect of reducing the output 53 of subtraction unit 50 by the counter value for one cell, namely, the value C.

Subtraction unit 50 has its output 53 coupled to an upper limit comparator 70. Upper limit comparator 70 is operative to compare the output 53 of subtraction unit 50 with the highest count value that can be clocked into the accumulator register 30 without causing the register to overflow. As long it is less than this upper limit value, the output 53 of subtraction unit 50 is coupled through an upper limit comparator 70 and applied to the input of the accumulator register 30, so that this value may be clocked into the register by the update clock $C_A$. However, if the output of the subtraction unit reaches the upper limit value, limit comparator 70 responds by disabling further incrementing of the accumulator register, until the output of the subtraction unit 50 falls below the upper limit value.

Figure 3:
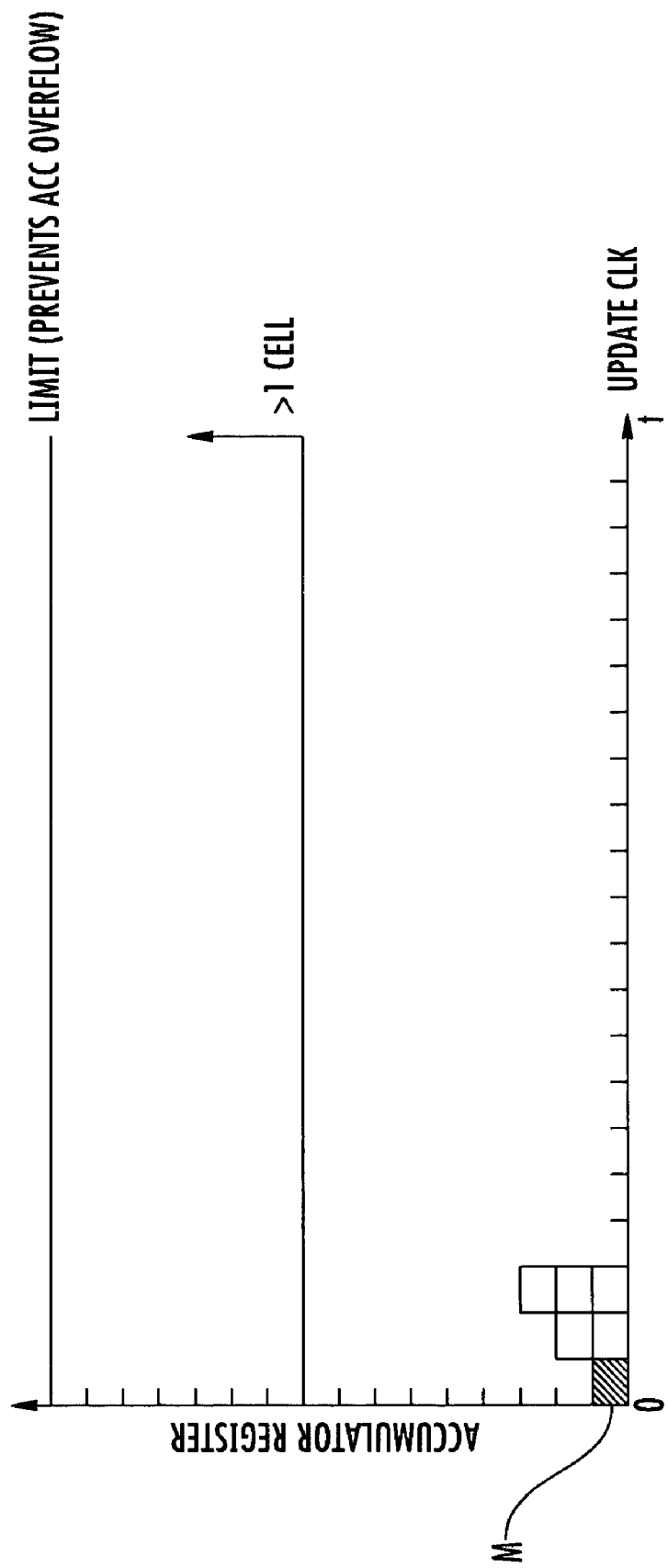
FIG. 3 is a timing diagram associated with the incrementing of the accumulator register of the data transmission scheduler of FIG. 2.
Figure 4:
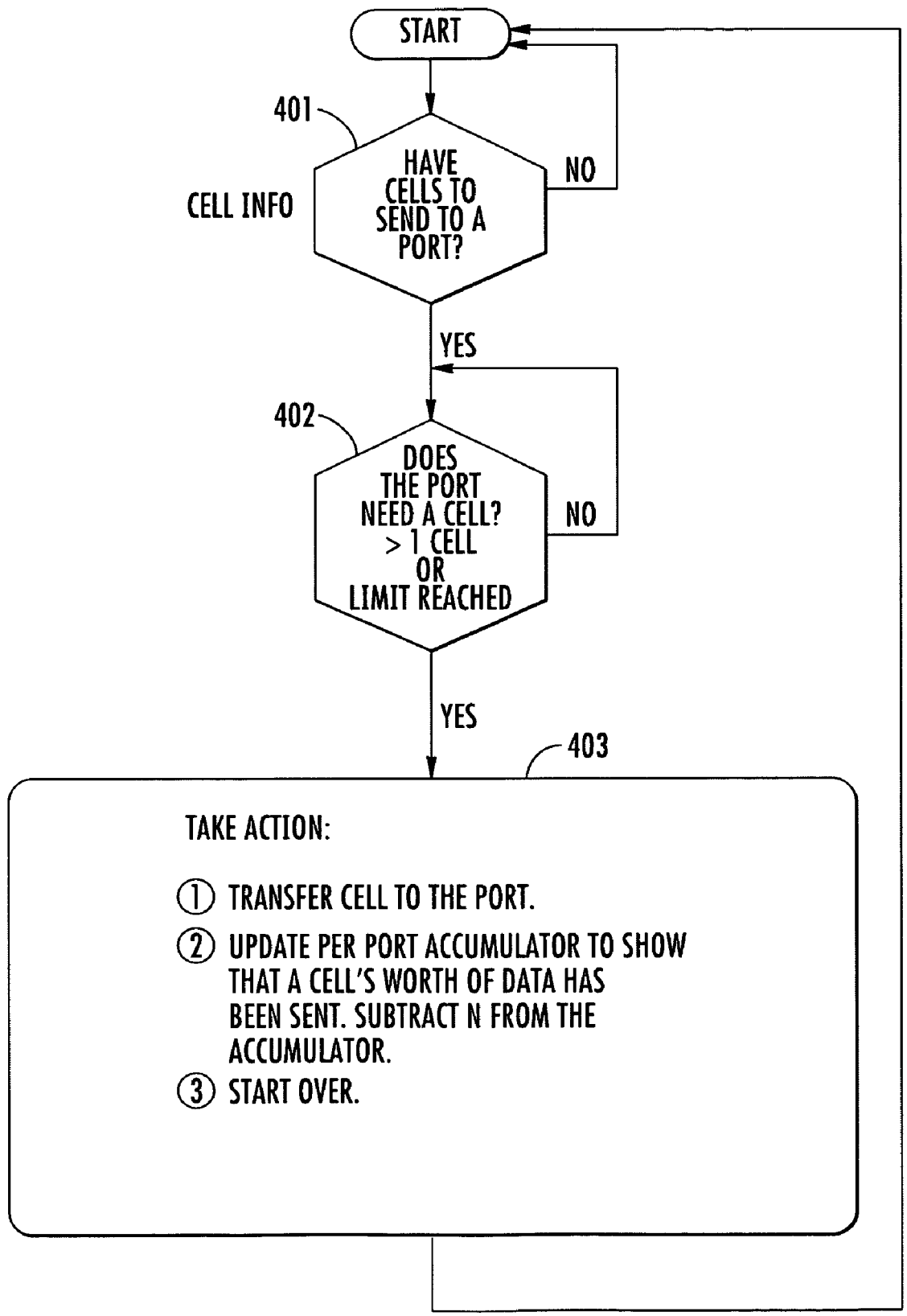
FIG. 4 is a flow chart associated with the operation of the data transmission scheduler of FIG. 2.

The operation of the 'per port' scheduler of FIG. 2 may be readily understood by reference to the accumulator incrementing timing diagram of FIG. 3 and the flow chart of FIG. 4. As described above, the quantity M that is supplied to the input 41 of adder 40 corresponds to that fraction of an ATM cell by which the contents of the scheduler's accumulator register 30 must be incremented at each scheduler clock signal $C_A$ (i.e. once per scheduler clock period), in order for the scheduler to properly read out the contents of its associated cell buffer at the intended data rate of the output port of interest.

For the purposes of providing a non-limiting, parametric example, let it be assumed that the data rate of the port of interest is 38.4 kbps, and that the scheduler update clock $C_A$ has a frequency of 250 KHz. With a single complete ATM cell being 424 bits in length, and with a port data rate of 38.4 kbps, then the effective cell transport rate for the port of interest is equal to $(38.4 \times 10^3 \text{ bits/sec.}) \times (1 \text{ cell}/424 \text{ bits})$, or approximately 90.57 cells per second. Since the scheduler update clock $C_A$ of 250 KHz has a period of $1/250 \times 10^{-3} = 4$ microseconds, then at each scheduler update clock $C_A$, the value of M that is applied to the input 41 of adder 40 equals 90.57 cells/sec.$\times 4 \times 10^{-6}$ sec.$= 3.6228 \times 10^{-4}$ cells.

Given this set of parameters, let it be initially assumed that the accumulator register 30 is cleared or reset, so that its count or accumulation value is initially zero. Since the count value stored in register 30 is zero, its output to scheduler controller 60 is less than the count value corresponding to one complete ATM cell. This also means that the output of subtraction unit 50, is less than the upper limit of register 30, so that the output of the upper limit comparator 70 will indicate that the upper limit value has not been reached.

As successive scheduler update clock signals $C_A$ are applied to accumulator register 30 and controller 60, the contents of the register 30 will be successively incremented by the value of M that is applied to the adder 40. During this time, as shown by query step 401 of the flow chart of FIG. 4, the control logic 60 continuously checks the state of its 'cell info' input to determine whether or not a complete ATM cell has been loaded into the associated per port buffer within the switch fabric. Once the answer to query step 401 is YES, the routine proceeds to query step 402 to determine whether the threshold >1 cell supplied by the accumulator register 30, or the upper limit value supplied by upper limit comparator 70 has been reached.

In the present example, the count value within the accumulator register 30 will eventually be greater than the count value that equates to one complete ATM cell, shown in the accumulator diagram of FIG. 3 as the threshold >1 cell. When this happens (i.e., the answer to query step 402 is YES), with the answer to query step 401 already being a YES, then in step 403, the controller issues a 'transfer cell' command, causing an ATM cell to be read out of its per port buffer and transmitted downlink to its associated port. In addition, the controller supplies the value C to the (−) input 52 of subtraction unit 50, so that the value C will be subtracted from the sum of the contents of the accumulator register 30 and the value M as provided by adder 40, at the next scheduler update clock signal $C_A$. This latter operation means that the incremented count level in the accumulator diagram of FIG. 3 (corresponding the contents of the register 30) will be decreased by the value C. The routine then loops back to step 401 and restarts the process.

As pointed out above, the limit comparator 70 is employed to prevent overflow of the accumulator register 30. Namely, should the output 53 of the subtraction unit reach the upper limit of the accumulator register 30, the upper limit comparator 70 will then proceed to disable further incrementing of register 30, until the output of the subtraction unit 50 falls below the upper limit value. This latter event takes place by the controller supplying the value C to the second input 52 of the subtraction unit 50, in response to the state of the 'cell info' input to the controller being a '1'. This indicates that the associated per port buffer within the switch fabric contains a complete a ATM cell that is ready for transmission downstream to its associated port. Until this happens, the limit comparator 70 continues to prevent further incrementing of the register 30.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. An arrangement for scheduling transport of information cells, received from a data communication network by respective data storage buffers of a single switch fabric of a primary channel bank as a single switching element of a data communication system, from said data storage buffers to associated data ports of said primary channel bank and one or more second channel banks as part of the single switching element of said data communication system, said arrangement comprising:
   a plurality of per port, data transport schedulers installed in said primary channel bank and being coupled with respective ones of said data storage buffers, each per port, data transport scheduler of said primary channel bank being operative to controllably read out information cells from its associated data storage buffer, for transport over a downstream communication link to a respective destination data port, at the data rate of said destination data port; and
   wherein a respective per port, data transport scheduler includes an accumulator, contents of which are sequentially modified, at a scheduler clock frequency, by a quantity M defined by a prescribed relationship between the size of an information cell, the data rate of the port with which said scheduler is associated, and said scheduler clock.

2. The arrangement according to claim 1, wherein said information cells comprise asynchronous transfer mode cells.

3. The arrangement according to claim 1, wherein said quantity M corresponds to a prescribed fraction of an information cell, by which the contents of said accumulator must be modified at the frequency of said scheduler clock, to reach a predetermined value associated with a complete information cell, and thereby enable said per port, data transport scheduler to read out the contents of said associated buffer for transport at the data rate of said destination data port.

4. The arrangement according to claim 1, wherein said respective per port, data transport scheduler is operative to read out the contents of said associated buffer for transport to said destination data port, in response said associated buffer containing a complete information cell and in response to the contents of said accumulator having reached at least said predetermined value.

5. The arrangement according to claim 1, wherein said respective per port, data transport scheduler is operative to reduce the contents of said accumulator by a value corresponding to a complete information cell, in the course of reading out the contents of said associated buffer for transport at the data rate of said destination data port.

6. The arrangement according to claim 1, wherein said respective per port, data transport scheduler is operative to prevent said accumulator from being modified beyond an upper limit thereof, and to reduce the contents of said accumulator by a value corresponding to a complete information cell, in the course of reading out the contents of said associated buffer for transport at the data rate of said destination data port.

7. A method of scheduling transport of information cells, received from a data communication network by respective data storage buffers of a single switch fabric of a primary channel bank as a single switching element of a data communication system, from said data storage buffers to associated data ports of said primary channel bank and one or more second channel banks of said data communication system as part of the single switching element, said method comprising the steps of:
   (a) within said primary channel bank, coupling a plurality of per port, data transport schedulers with respective ones of said data storage buffers; and
   (b) causing a respective per port, data transport scheduler of said primary channel bank to controllably read out information cells from its associated data storage buffer, for transport over a downstream communication link to a respective destination data port, at the data rate of said destination data port; and
   wherein a respective per data transport scheduler includes an accumulator, and wherein step (b) comprises sequentially modifying contents of said accumulator, at a scheduler clock frequency, by a quantity defined by a prescribed relationship between the size of an information cell, the data rate of the port with which said scheduler is associated, and said scheduler clock.

8. The method according to claim 7, wherein said information cells comprise asynchronous transfer mode cells.

9. The method according to claim 7, wherein said quantity M corresponds to a prescribed fraction of an information cell, by which the contents of said accumulator must be modified in step (b) at the frequency of said scheduler clock, to reach a predetermined value associated with a complete information cell, and thereby enable said per port, data transport scheduler to read out the contents of said associated buffer for transport at the data rate of said destination data port.

10. The method according to claim 7, wherein step (b) comprises reading out the contents of said associated buffer for transport to said destination data port, in response said associated buffer containing a complete information cell and in response to the contents of said accumulator having reached at least said predetermined value.

11. The method according to claim 7, wherein step (b) comprises reducing the contents of said accumulator by a value corresponding to a complete information cell, in the course of reading out the contents of said associated buffer for transport at the data rate of said destination data port.

12. The method according to claim 7, wherein step (b) comprises preventing said accumulator from being modified beyond an upper limit thereof, and reducing the contents of said accumulator by a value corresponding to a complete information cell, in the course of reading out the contents of said associated buffer for transport at the data rate of said destination data port.

13. In a data communication system having a primary channel bank as a single switching element and one or more secondary channel banks as part of the single switching element, said primary channel bank containing a single switch fabric, respective data storage buffers of which are adapted to receive information cells from a data communication network, and wherein said information cells are read out from said data storage buffers to associated data ports of said primary channel bank and one or more second channel banks of said data communication system, the improvement comprising an information cell transport scheduling mechanism installed in said primary channel bank, being coupled with respective ones of said data storage buffers, and being operative to controllably read out information cells from said data storage buffers, for transport over a downstream communication link to associated destination data ports, at the data rates of said destination data ports; and wherein a respective per port, data transport scheduler includes an accumulator, contents of which are sequentially modified, at a scheduler clock frequency, by a quantity M defined by a prescribed relationship between the size of an information cell, the data rate of the port with which said scheduler is associated, and said scheduler clock.

14. The improvement according to claim 13, wherein said information cells comprise asynchronous transfer mode cells.

15. The improvement according to claim 13, wherein said information cell transport scheduling mechanism comprises a plurality of per port, data transport schedulers, each of which is operative to controllably read out information cells from its associated data storage buffer, for transport over a downstream communication link to a respective destination data port, at the data rate of said destination data port.

16. The improvement according to claim 15, wherein said quantity M corresponds to a prescribed fraction of an information cell, by which the contents of said accumulator must be modified at the frequency of said scheduler clock, to reach a predetermined value associated with a complete information cell, and thereby enable said per port, data transport scheduler to read out the contents of said associated buffer for transport at the data rate of said destination data port.

17. The improvement according to claim 16, wherein said respective per port, data transport scheduler is operative to read out the contents of said associated buffer for transport to said destination data port, in response said associated buffer containing a complete information cell and in response to the contents of said accumulator having reached at least said predetermined value.

18. An arrangement for scheduling transport of information cells, received from a data communication network by respective data storage buffers of a switch fabric of a primary channel bank of a data communication system, from said data storage buffers to associated data ports of said primary channel bank and one or more second channel banks of said data communication system, said arrangement comprising:

a plurality of per port, data transport schedulers installed in said primary channel bank and being coupled with respective ones of said data storage buffers, each per port, data transport scheduler of said primary channel bank being operative to controllably read out information cells from its associated data storage buffer, for transport over a downstream communication link to a respective destination data port, at the data rate of said destination data port, wherein a respective per port, data transport scheduler includes an accumulator, contents of which are sequentially modified, at a scheduler clock frequency, by a quantity M defined by a prescribed relationship between the size of an information cell, the data rate of the port with which said scheduler is associated, and said scheduler clock.

19. The arrangement according to claim 18, wherein said quantity M corresponds to a prescribed fraction of an information cell, by which the contents of said accumulator must be modified at the frequency of said scheduler clock, to reach a predetermined value associated with a complete information cell, and thereby enable said per port, data transport scheduler to read out the contents of said associated buffer for transport at the data rate of said destination data port.

20. The arrangement according to claim 18, wherein said respective per port, data transport scheduler is operative to read out the contents of said associated buffer for transport to said destination data port, in response said associated buffer containing a complete information cell and in response to the contents of said accumulator having reached at least said predetermined value.

21. The arrangement according to claim 18, wherein said respective per port, data transport scheduler is operative to reduce the contents of said accumulator by a value corresponding to a complete information cell, in the course of reading out the contents of said associated buffer for transport at the data rate of said destination data port.

22. The arrangement according to claim 18, wherein said respective per port, data transport scheduler is operative to prevent said accumulator from being modified beyond an upper limit thereof, and to reduce the contents of said accumulator by a value corresponding to a complete information cell, in the course of reading out the contents of said associated buffer for transport at the data rate of said destination data port.

23. A method of scheduling transport of information cells, received from a data communication network by respective data storage buffers of a switch fabric of a primary channel bank of a data communication system, from said data storage buffers to associated data ports of said primary channel bank and one or more second channel banks of said data communication system, said method comprising the steps of:

(a) within said primary channel bank, coupling a plurality of per port, data transport schedulers with respective ones of said data storage buffers; and (b) causing a respective per port, data transport scheduler of said primary channel bank to controllably read out information cells from its associated data storage buffer, for transport over a downstream communication link to a respective destination data port, at the data rate of said destination data port, wherein a respective per port, data transport scheduler includes an accumulator, and wherein step (b) comprises sequentially modifying contents of said accumulator, at a scheduler clock frequency, by a quantity M defined by a prescribed relationship between the size of an information cell, the data rate of the port with which said scheduler is associated, and said scheduler clock.

24. In a data communication system having a primary channel bank and one or more secondary channel banks, said primary channel bank containing a switch fabric, respective data storage buffers of which are adapted to receive information cells from a data communication network, and wherein said information cells are read out from said data storage buffers to associated data ports of said primary channel bank and one or more second channel banks of said data communication system, the improvement comprising an information cell transport scheduling mechanism installed in said primary channel bank, being coupled with respective ones of said data storage buffers, and being operative to controllably read out information cells from said data storage buffers, for transport over a downstream communication link to associated destination data ports, at the data rates of said destination data ports, wherein said information cell transport scheduling mechanism comprises a plurality of per port, data transport schedulers, each of which is operative to controllably read out information cells from its associated data storage buffer, for transport over a downstream communication link to a respective destination data port, at the data rate of said destination data port, wherein a respective per port, data transport scheduler includes an accumulator, contents of which are sequentially modified, at a scheduler clock frequency, by a quantity M defined by a prescribed relationship between the size of an information cell, the data rate of the port with which said scheduler is associated, and said scheduler clock.

* * * * *